United States Patent [19]

Sincerbox

[11] Patent Number: 4,540,244
[45] Date of Patent: Sep. 10, 1985

[54] OPTO-OPTICAL LIGHT DEFLECTOR/MODULATOR

[75] Inventor: Glenn T. Sincerbox, San Jose, Calif.

[73] Assignee: International Business Machines Corporation, Armonk, N.Y.

[21] Appl. No.: 383,044

[22] Filed: May 28, 1982

[51] Int. Cl.³ .......................... G02B 5/172; G02B 5/18
[52] U.S. Cl. ............................... 350/354; 350/162.11; 350/162.17; 350/162.20
[58] Field of Search .............. 350/162.11, 354, 162.17, 350/162.20

[56] References Cited

U.S. PATENT DOCUMENTS 3,790,252  2/1974  Pao ...................................... 350/354
4,508,431  5/1985  Hershaw .............................. 350/354

OTHER PUBLICATIONS

Siegman, "Proposed Picosecond Excited-State Measurement Method Using a Tunable-Laser-Induced Grating", *Applied Physics Letters*, vol. 30, No. 1, Jan. 1977, pp. 21 to 23.

*Primary Examiner*—John K. Corbin
*Assistant Examiner*—William Propp
*Attorney, Agent, or Firm*—Joseph E. Kieninger

[57] ABSTRACT

An opto-optical light deflector/modulator has means for providing first and second coherent wave fronts of wavelength ($\lambda_0$) to travel in a transparent optical active medium to produce an optically generated standing wave that induces a periodic refractive index variation in the medium suitable for diffraction purposes. The device also includes means for providing a third wavefront ($\lambda_1$) to travel in said medium which is diffracted by the periodic refractive index variation induced by the first and second wavefronts.

9 Claims, 3 Drawing Figures

OPTO-OPTICAL LIGHT DEFLECTOR/MODULATOR

DESCRIPTION

1. Technical Field

This invention relates to an optic device for light deflection and more particularly to an opto-optical light deflector/modulator.

2. Background Art

Current non-mechanical light deflection techniques include electro optic and acoustic-optic devices. Electro optic devices are relatively fast since they are inertialess. They rotate the plane of polarization of incoming light by the linear electro optic Pockels effect in materials like potassium dihydrogen phosphate and by the addition of a following birefringent crystal cause the light to propagate as either the ordinary or extraordinary ray. By cascading electro optic and birefringent stages, a multi-spot light deflector is realized. This device usually requires large voltages for the longitudinal effect, on the order of thousands of volts, and complicates the electronics when high deflection rates ($<\mu$ sec) are required. For the transverse effect smaller voltages are used, but a longer interaction length is required with the resulting reduction in aperture causing a reduction in resolution and alignment problem.

The acousto-optic device operates by diffraction from a periodic structure, refractive index variation, introduced into an optically transparent material by a travelling acoustic wave. These are inherently small aperture devices because the small propagation velocity of the acoustic wave inside the material requires the cross section of the light beam to be small for the device to have a fast response time. In addition, use of a large aperture also introduces a distortion into the deflected wavefront as the periodicity of the diffracting structure changes from one side of the aperture to the other during deflection.

An opto-optical light deflector is disclosed in U.S. Pat. No. 3,790,252. The deflection of the light beam is achieved by changing in a spatially non-homogeneous manner the refracted index of an interaction medium through which a control light beam and a controlling beam pass at an angle to each other. This approach varies the density of the diffraction material so that the density increases progressively, preferably linearly from one side to the other. One of his embodiments uses a diffraction pattern; however, this approach does not involve changing this diffraction pattern to achieve multiple deflection positions.

SUMMARY OF THE INVENTION

An opto-optical light deflector/modulator has a transparent optical active medium, for example, barium titanate. The deflector has means for providing first and second coherent wave fronts of wavelength ($\lambda_0$) to travel in the medium to produce by interference an optically generated standing wave that induces a periodic refractive index variation in the medium suitable for diffraction purposes. The device also includes means for providing a third wave front ($\lambda_1$) to travel in said medium which is diffracted by the periodic refractive index variation induced by the first and second wave fronts. The wavelength of the first and second wave fronts are varied to alter the periodicity of the refractive index variation thereby causing the diffraction direction of the third wave front to be altered. This deflector uses optically generated standing waves to induce a periodic refractive index variation which is used for diffraction purposes. The device can be used as a deflector or as a modulator.

For a further understanding of the invention, and of the objects and advantages thereof, reference will be had to the following detailed description and to the accompanying drawings and to the appended claims wherein the specific embodiments of the invention are shown.

BRIEF DESCRIPTION OF THE DRAWINGS

The invention will now be described by way of example and reference to the accompanying drawings in which.

DESCRIPTION OF THE PREFRRED EMBODIMENT

In this invention an optically generated standing wave is formed in a transparent optical active medium. The medium provides provides periodic variation in refractive index or amplitude transmittance by responding to the periodic variation and intensity in the optical standing wave that has been created by the two interfering wavefronts. These mechanisms are well known in the literature and include such phenomena as population inversion, photo-bleaching, photo-refraction and other nonlinear effects. The optical wave will propagate through the medium at the speed of light and impose no aperture/response time restrictions. By varying the wavelength of the incident light, the standing wave frequency can be shifted giving rise to the change in the diffraction angle. Deflection and/or modulation speed is restricted to the speed at which the wavelength can be shifted, or turned on and off in the case of modulation, and the life of the effect causing the refractive index modulation.

Figure 1A:
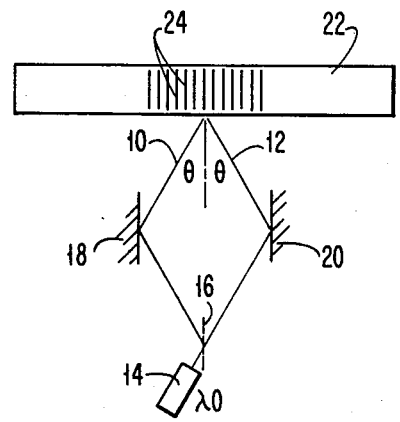
FIGS. 1A and 1B are top views of a preferred embodiment of the deflector in accordance with this invention.

In FIG. 1A, the interference of two wavefronts 10 and 12 of wavelength $\lambda_0$ that are obtained from light source 14 by use of a beam splitter 16, are directed by mirrors 18 and 20 to be incident at equal angles $\theta$ to the transparent medium 22 normal and produce a periodic structure 24 of spacing $$d_0 = \lambda_0/2 \sin \theta$$

Variation of the wavelength of the two interfering wavefronts by an amount $\Delta\lambda$ to another wavefront $\Delta_m$ results in the formation of a new periodic structure of spacing $$d_m = \lambda_m/2 \sin \theta$$

Examples of light source 14 include lasers, such as Argon, GaAs, and dye lasers. Examples of the transparent medium which cause refractive index changes are, barium titanate, bismuth silicon oxide, lithium niobate, and, liquid crystals. Examples of the transparent medium which cause amplitude changes are sodium vapor, ruby and a liquid solution of organic saturable absorbers.

Figure 1B:
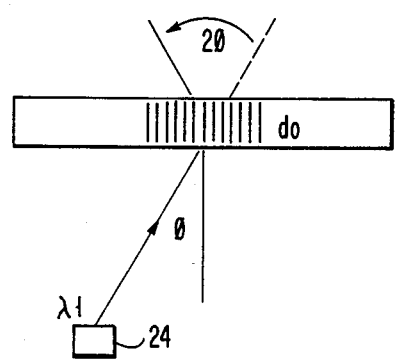

When this structures is illuminated with a third beam from source 24 at wavelength $\lambda_1$, as shown in FIG. 1B, then efficient diffraction occurs when the Bragg condition is satisfied, at angle $\phi$:

$$\lambda_1/2 \sin \phi = \lambda_0/2 \sin \theta$$

The appropriate illumination angle is therefore given by:

$$\sin\phi = \frac{\lambda_I}{\lambda_O} \sin\theta$$

The beam at $\lambda_1$ is deflected by an angle $2\phi$ by the structure created by $\lambda_0$. For a change in the pumping wavelength of $\Delta\lambda$ the change in angle $\Delta\phi$ obtained by differentiating the above equation and is given by:

$$\Delta\phi = \frac{\Delta\lambda}{\lambda_O} \tan\phi$$

Near 45°, and at a wavelength of 5729A, this gives $\Delta\phi \approx 0.01°/A$. A 100 angstroms change in wavelength causes a 1° deflection. Such a wavelength change may be created by electro-optically or piezoelectrically tuning a dye laser, by electro-optic intracavity tuning of an Argon or Krypton laser or by current and/or thermal tuning of a solid state laser.

Figure 2:
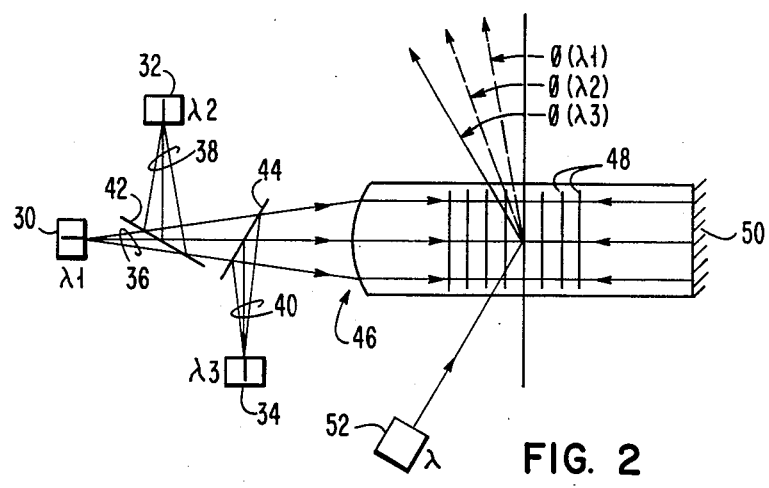
FIG. 2 is a top view of a second preferred embodiment of a deflector in accordance with this invention.

A second embodiment is shown in FIG. 2. In this embodiment, a set of lasers 30, 32 and 34 each at a discrete wavelength $\lambda_1$, $\lambda_2$ and $\lambda_3$ respectively, eliminates the need to vary the wavelength of the single laser used in the previous embodiment. The three beams 36, 38 and 40 from lasers 30, 32 and 34 are combined by beam splitters 42 and 44 and passed through a collimating surface 46 to produce a standing wave periodic structure 48 with the use of a mirror 50. The beam to be deflected is incident on the periodic structure from source 52. This arrangement produces a random digital effect since the transistion from one diffracting structure to the next is discontinuous and produces large angular effects operating at laser switching speeds. Additional deflection directions can be achieved by appropriately combining several lasers into the active medium. When the device shown in FIG. 2 operates with a single laser 42, or when the device in FIG. 1 operates at a single wavelength, an effective large aperture modulator results. This occurs by altering the intensity of the structure-forming wavefronts and hence the strength of the periodic variations in refractive index will also vary, not necessarily in a linear manner. The subsequent strength of the diffracted wavefront will likewise vary. In either direction, diffracted or undiffracted, a signal modulation will be impressed on the controlled wavefront. When several lasers are used, it is a multi-direction light deflector and can additionally be used for multi-channel modulation and/or multiplexing of signals.

Although a preferred embodiment of this invention has been described, it is understood that numerous variations may be made in accordance with the principles of this invention.

What is claimed is:

1. An opto-optical light deflector comprising:
   a transparent optical active medium,
   means for providing first and second coherent wavefronts of wavelength ($\lambda_0$) to travel in said medium thereby producing an optically generated standing wave that induces a periodic variation in the optical properties for diffraction purposes,
   means for providing a third wave front ($\lambda_1$) to travel in said medium, said third wavefront being diffracted by the periodic variation, and
   means for varying the wavelength of said first wavefront and said second wavefront to the same wavelength ($\lambda_m$) to alter the periodicity of the variation whereby the diffraction direction of said third wavefront is altered.

2. A deflector as described in claim 1 wherein said medium produces a periodic variation in refractive index upon exposure to an optical standing wave.

3. A deflector as described in claim 1 wherein said medium produces a periodic variation in amplitude transmittance upon exposure to an optical standing wave.

4. A deflector as described in claim 1 wherein said medium is taken from the group consisting of ruby, liquid crystals, sodium vapor, barium titanate, bismuth silicon oxide, lithium niobate, and a liquid solution of organic saturable absorbers.

5. A deflector as described in claim 1 wherein said means for varying the wavelength of said first wavefront is a piezoelectric controlled dye laser.

6. A deflector as described in claim 1 wherein said means for varying the wavelength of said first wavefront is a current tuned solid state laser.

7. A deflector as described in claim 1 wherein said means for varying the wavelength of said first wavefront is electro-optic intracavity tuning of a gas laser.

8. A deflector as described in claim 1 wherein said means for varying the wavelength of said first and second wavefronts is means for selecting a wavelength from a multiplicity of lasers where each of said lasers is at a different wavelength.

9. An opto-optical digital light deflector comprising a transparent optically active medium,
   means for providing a multiplicity of first wavefronts of discretely different wavelengths, $\lambda_{1,2,3} \ldots m$, to travel in said medium,
   reflection means for generating second wavefronts from said first wavefronts, said first and said second wavefronts being at the same wavelength $\lambda_{1,2,3} \ldots m$, to travel in said medium thereby producing optically generated standing waves that induce a periodic variation in the optical properties for diffraction purposes, and
   means for randomly selecting an individual wavefront from said multiplicity of fixed wavelengths.

* * * * *